Dec. 8, 1925.
R. L. GOODFELLOW
SHOCK ABSORBER
Filed Dec. 15, 1924      5 Sheets-Sheet 4
1,564,556
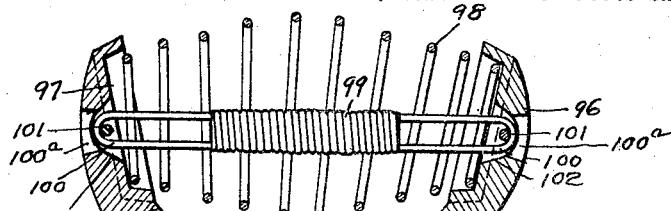
Fig.13.
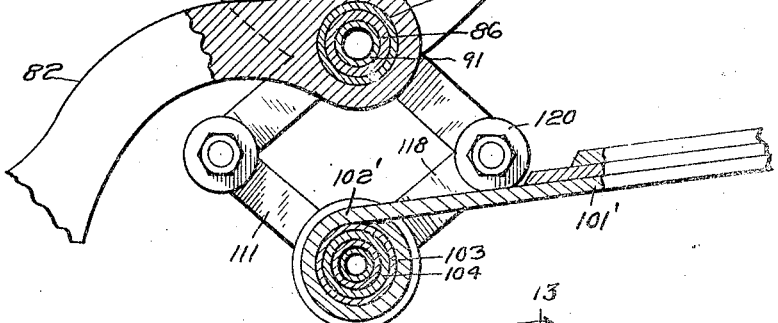
Fig.14.      Fig.15.
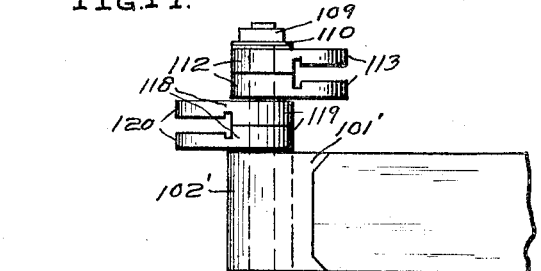
Fig.16.
Inventor
ROBERT L. GOODFELLOW,
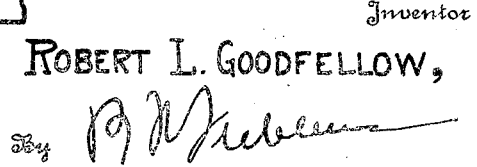
Attorney

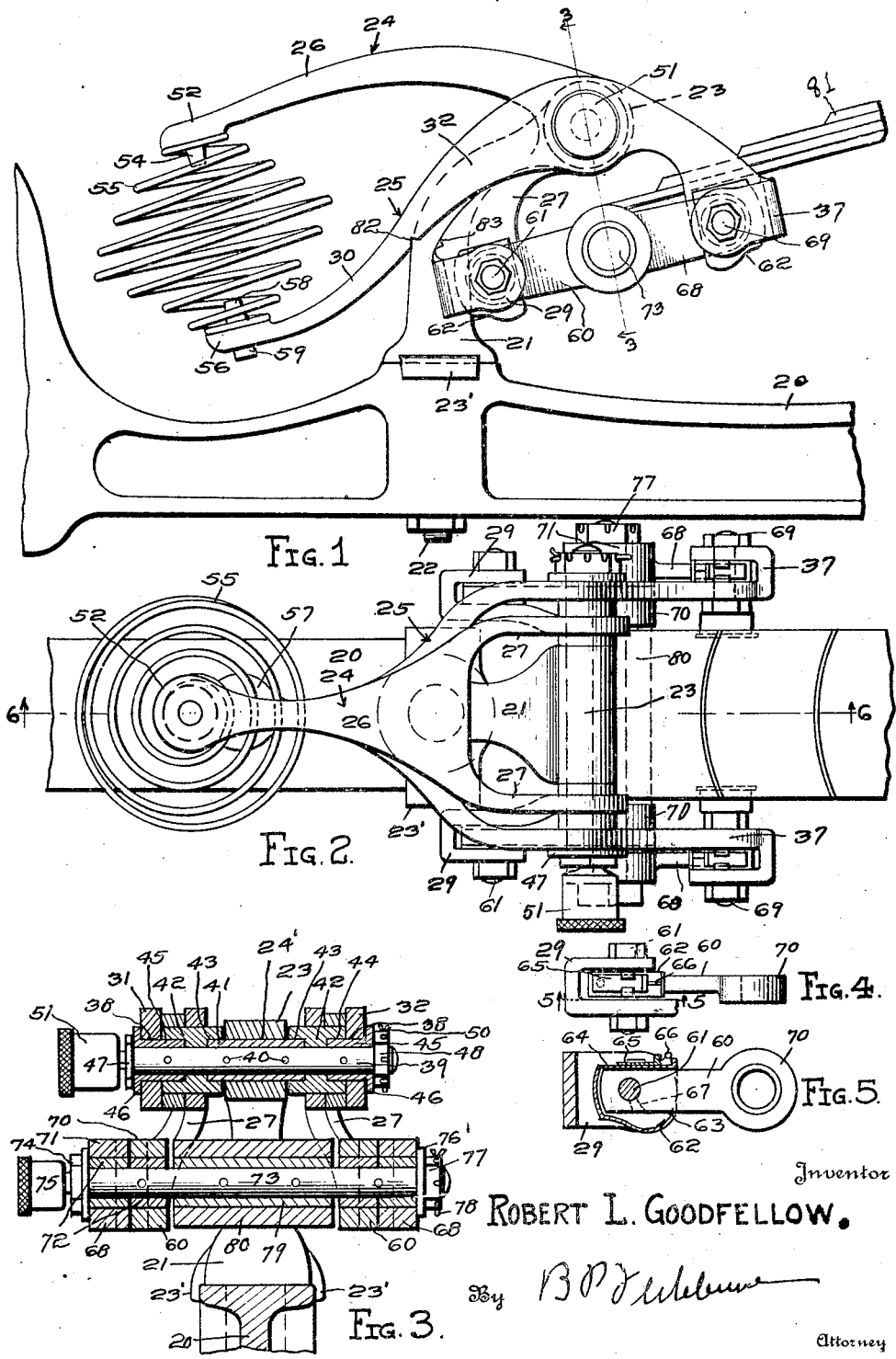

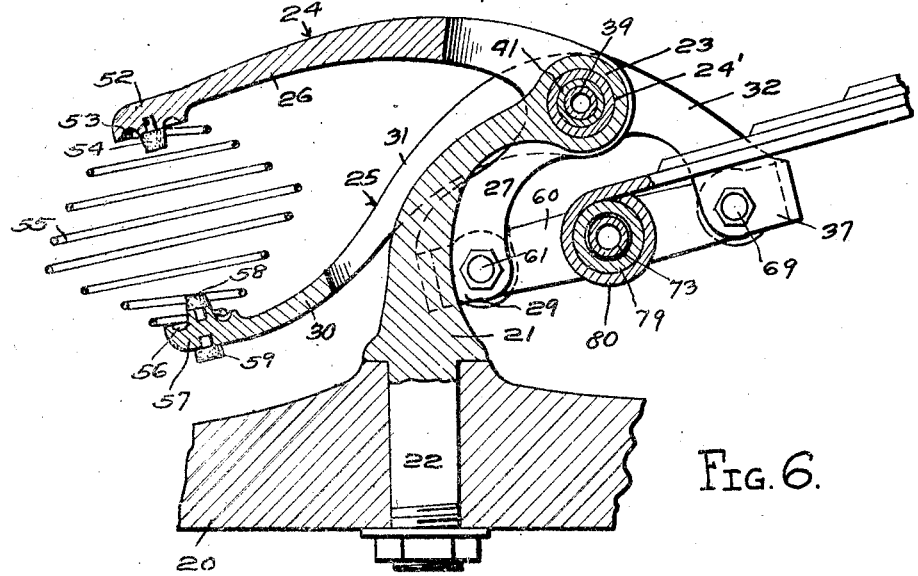

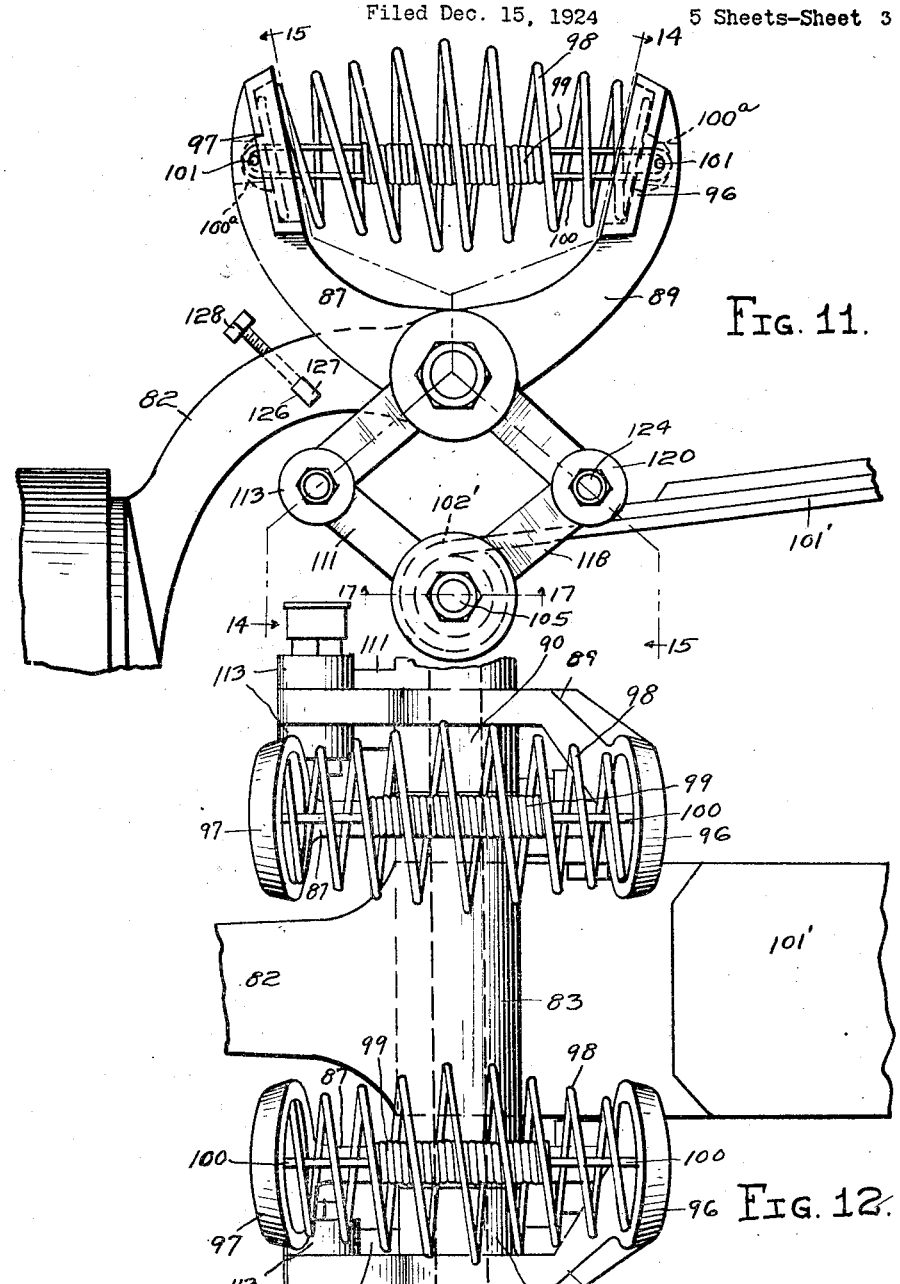

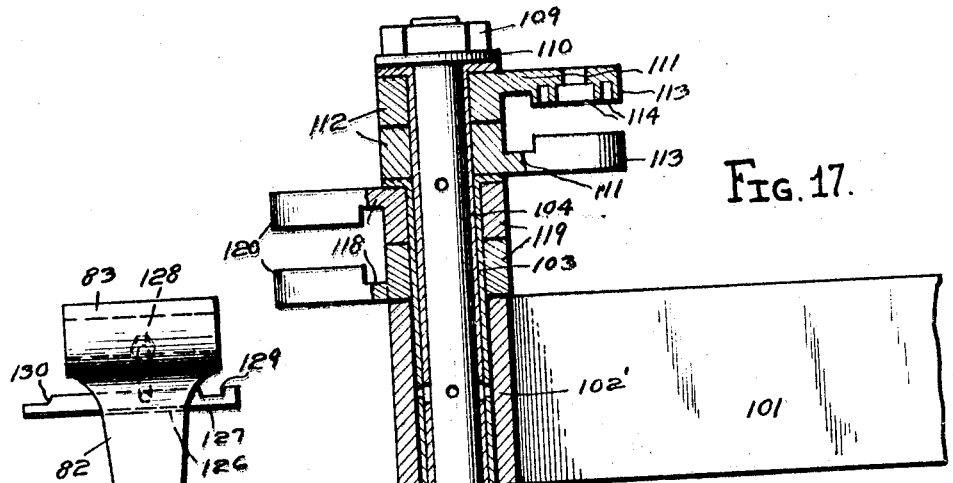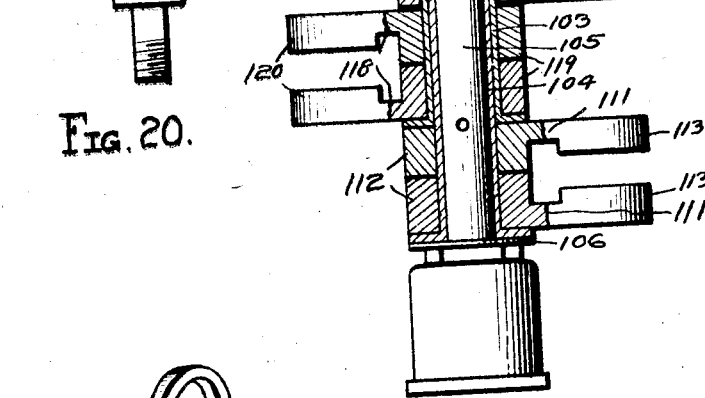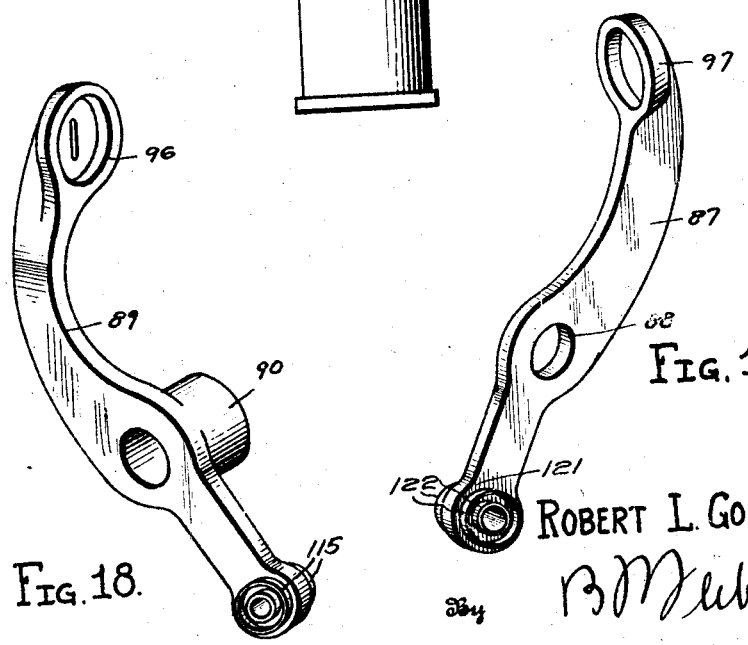

Patented Dec. 8, 1925.

1,564,556

UNITED STATES PATENT OFFICE.

ROBERT L. GOODFELLOW, OF BINGER, OKLAHOMA.

SHOCK ABSORBER.

Application filed December 15, 1924. Serial No. 756,059.

*To all whom it may concern:*

Be it known that I, ROBERT L. GOODFELLOW, a citizen of the United States, residing at Binger, in the county of Caddo and State of Oklahoma, have invented certain new and useful Improvements in Shock Absorbers, of which the following is a specification.

My invention relates to improvements in shock absorbers.

In accordance with my invention, the use of a very light and flexible coil spring or springs in the shock absorber is rendered possible by having the different leverages controlling the action and stress of the coil spring, very small, such leverage decreasing as the parts of the shock absorber contract. This causes equalization on all shocks, and the leverage controlling the action is longer, thus making the correct action. Perfect equalization of shocks and stresses produces a high degree of susceptibility and resiliency of the coil springs, eliminating the short bumps and jarrings, thus taking the pounding and hammering off of the tires and greatly reducing the vibration and strain on the car. Further, the springs do not have the strong quick rebound, which would intensify the rebound of the car body, and these springs will serve as an absorber for the rebound shocks caused by the leaf springs, and after reaching the normal position, they will snub further upward motion. By having the same free action of other spring shackles, the center of the coil springs are mounted on a parallel line with the fulcrum, thereby causing direct coil spring action on all shocks, absorbing side shocks as smoothly and effectively as they do straight shocks and rebounds. Perfect stabilization of the body is obtained by having a simple and effective side sway stop, that causes the correct admissible amount of outward and inward motion, in proportion to the downward and upward motion, at each end of the leaf springs, when checking side sway, by compressing the coil springs on both sides of the car. The device possesses effective and advantageous operation, neat appearance, simplicity of design, lightness, yet ample strength.

Other objects and advantages of the invention will be apparent during the course of the following description.

In the accompanying drawings forming a part of this specification and in which like numerals are employed to designate like parts throughout the same, Figure 1 is a side elevation of a shock absorber embodying my invention, Figure 2 is a plan view of the same, Figure 3 is a transverse section taken on line 3—3 of Figure 1, Figure 4 is a plan view of one of the links and associated elements included in the device, Figure 5 is a detailed section taken on line 5—5 of Figure 4, Figure 6 is a longitudinal vertical section taken on line 6—6 of Figure 2, Figure 7 is a perspective view of one of the swinging members, Figure 8 is a similar view of the companion swinging member, Figure 9 is a perspective view of a grease cup, Figure 10 is a detailed horizontal section through the adjustable joint between the lever and its arm, Figure 11 is a side elevation of a second form of shock absorber embodying my invention, Figure 12 is a plan view of the same, Figure 13 is a transverse section taken on line 13—13 of Figure 15, Figure 14 is a transverse section taken on line 14—14 of Figure 11, Figure 15 is a similar view taken on line 15—15 of Figure 11, Figure 16 is a plan view of the connecting links and associated elements, Figure 17 is a horizontal section taken on line 17—17 of Figure 11, Figure 18 is a perspective view of the outer arm or lever, Figure 19 is a similar view of the inner arm or lever, and, Figure 20 is a side elevation of the perch, showing the adjustable stop.

In the drawings wherein for the purpose of illustration is shown a preferred embodiment of my invention, the numeral 20 designates the axle of an automobile, such as the front axle of a Ford automobile. Arranged upon this front axle is a perch 21, the shank 22 of which passes through the usual vertical opening in the axle. This perch is provided with the flanges 23', to hold the perch against turning movement, should the nut of the perch become accidently loosened.

The perch 21 is provided at its upper end with a horizontal head 23 having an opening 24' formed therein.

The shock absorber, embodies companion swinging members or frames 24 and 25. The member 24 includes an upper preferably curved arm 26, which is forked providing a pair of spaced arms 27, which depend from the arm 26 and are inclined outwardly, with respect to the axle 20. The arms 27 are preferably flat and have openings 28 formed therein. The arms 27 are bent at their lower free ends into hooked portions 29, as shown. The lower swinging companion member or frame 25 embodies an arm or lever 30, which is forked at its inner or rear end, providing spaced arms 31 and 32. It is preferred that the arm 31 be laterally adjustable with respect to the lever or arm 30, and to accomplish this, the arm or lever 30 is provided in its base 33, with a transverse recess 34, square in cross section, for receiving a shank 35, square in cross section, rigidly attached to the arm 31. The shank 35 is shorter than the depth of the recess 34, and hence the arm 31 may be shifted laterally toward the arm 32, to compensate for wear, as will be described. The base 33 is preferably provided with a surrounding flange 36, receiving the shank 35 and a part of the arm 31, and positively preventing any turning movement of the arm upon the base. The arms 31 and 32 are bent at their free ends into hooked portions 37. The arms 31 and 32 extend inwardly, in the general longitudinal direction of the lever 30. The arms 31 and 32 are provided near their centers with openings 38, as shown.

A tubular bolt or pivot element 39, see particularly Figure 3, is provided with apertures 40, for the escape of oil or like lubricant. This bolt is placed through a brass bushing 41, held within the opening 24' of the head 23 of the perch. The bushing 41 and bolt project beyond the opposite sides of the head 23, as shown. Annular brass bushings 42 are mounted upon the end portions of the bolt 39 and have inner recesses 43, receiving the ends of the bushing 41. The bushings 42 have outer recesses 44, receiving the inner ends of tubular brass bushings 45, which are mounted upon the ends of the bolt 39. The bushings 45 are flanged at their outer ends, as shown at 46. The bushing 45 at the left is held in place by the head 47 of the bolt while the other bushing 45 is held in place by the nut 48, held against accidental displacement by means of a cotter pin 50 or the like. As clearly shown in Figure 3 the tubular bushings 45 are pivotally mounted within the openings 38, while the bushings 42 are pivotally mounted within the openings 28. A grease cup 51 is connected with the head 47 of the bolt and discharges grease into the tubular bolt which in turn properly lubricates the several parts thereof. It is obvious that the head 47 and nut 48 and associated elements hold the arms 31 and 32 against lateral displacement, and when the parts wear the same may be taken up by screwing up the nut 48, which may be allowed by virtue of the lateral adjustability of the arm 31, as described.

The arm or lever 26 is provided at its outer end with a head 52, provided upon its lower face with an annular recess 53. This head also carries a depending rubber bumper 54, suitably secured thereto. The recess 53 receives the upper end of a double conical compressible coil spring 55, the lower end of which is seated within a recess or groove 56, formed in the upper face of a head 57, carried by the arm or lever 30. The head 57 is provided with upstanding rubber bumper 58, adapted to engage with the bumper 54, prior to the contacting of the leaf spring with the axle, to prevent such contact, to be more fully explained. The head 57 is provided upon its bottom with a rubber bumper 59, suitably secured thereto, to contact with the upper face of the axle 20, for checking side sway of the body of the car, as will be more fully explained.

The numeral 60 designates a pair of inner links, the outer ends of which fit within the forked ends 29 of the arms 27. These outer ends and forked ends are apertured for receiving pivot elements or bolts 61, as shown.

As more clearly shown in Figures 4 and 5, a grease cup 62 is provided having an opening 63 in its rear end, for receiving the forward end of the link 60. The side walls of the grease cup are confined between the sides of the link and the sides of the forked ends 29. The top of the grease cup has an opening 64 through which the oil or the like may be passed and this opening is covered by a sliding door 65, urged forwardly by a spring 66, as shown. The links 60 are preferably provided in their lower edge with ports 67, by means of which the oil or lubricant may splash upwardly to the bolts 61 and contacting parts. The numeral 68 designates a pair of outer links, the outer ends of which are arranged with the forked ends 37 of the arms 31 and 32. These links and forked ends are apertured for receiving bolts or pivot elements 69. The links 68 are equipped with the same grease cups, 62 as shown.

The links 60 and 68 are provided at their inner ends with heads 70 and 71, having openings for receiving brass bushings 72. These brass bushings receive a tubular bolt 73 having apertures for the discharge of the oil or grease. The tubular bolt 73 is provided at one end with a head 74, carrying a grease cup 75, to supply the oil or grease to the interior of the tubular bolt, and at its opposite end with a washer 76, and a nut 77, locked against accidental rotation by a cotter pin or the like. The bolt 73 receives upon its central portion a brass bushing 79, held by the eye 80, formed upon the front left spring 81 of a Ford automobile or the like.

If desired, the arm 30 may have a notch 82 cut therein, opposite a notch 83, in the arm 27, and a suitable piece of metal may be passed between these arms into the notches, to temporarily lock the arms 26 and 30 against further swinging movement toward each other. This enables the eye 80 of the left spring to be more conveniently applied to the bolt 73. Of course this piece of metal is removed from these notches when the shock absorber is in use.

In operation, when absorbing primary shocks, as the axle 20 moves upwardly, the left spring 81 remaining relatively stationary, against vertical movement, the links 60 and 68 have their inner ends drawn downwardly, and the companion swinging members are turned upon their pivots, so that the arms 26 and 30 are moved toward each other, to compress the spring 55. The spring therefore absorbs the primary shock. In absorbing the secondary shocks, when the body of the vehicle moves upwardly with respect to the axle 20, the links 60 and 68 have their inner ends moved upwardly beyond the normal position, and hence the swinging companion members are turned upon their pivots, so that their arms 26 and 30 move toward each other, and compress the spring 55. When the body of the car tends to sway sideways the device functions to retard such swaying movement. Assuming that the car sways to the left, it will be seen that the links 60 and 68 of the shock absorber to the right, are moved upwardly and inwardly. This action first compressed the spring 55 and subsequently the bumper 59 is moved downwardly in contact with the axle 20, thus arresting the side sway. The shock absorber upon the left side also functions to retard or prevent the side sway to the left. In this shock absorber to the left, the links 60 and 68 are swung downwardly and outwardly, thereby compressing the spring 55, which will oppose the swaying movement.

Attention being called to Figures 11 to 19 inclusive, the numeral 82 designates a perch secured to the rear axle of an automobile such as a Ford automobile. This perch is provided with a tubular head 83, receiving therein outer tubular brass bushings 84, having flanges 85. Mounted within the outer bushings 84 are inner tubular brass bushings 86, as shown. The numeral 87 designates a pair of inner levers or arms, which are inclined, and are provided between their ends with openings 88, pivotally receiving the ends of the bushings 84. The numeral 89 designates a pair of outer levers or arms, which are inclined and provided between their ends with tubular bosses 90, pivotally mounted upon the outer ends of the bushings 86. The bushings 86 receive a tubular bolt 91, which pivotally supports the parts. This tubular bolt is provided at one end with a washer 92 and nut 93 and at its opposite end with a head 94, carrying a cap 95, which constitutes a grease cup. A suitable lubricant is therefore fed through the tubular bolt to the several surrounding contacting elements. The levers or arms 87 and 89 are arranged in pairs, producing like construction, with the opposite ends of the levers extending above and below their pivots. The upper ends of the levers 89 are offset inwardly, to bring heads or cup 96, formed therein in alinement with heads or cups 97, carried by the upper ends of levers 87. Compressible coil springs 98 have their ends held within these cups 96 and 97. Retractile coil springs 99 are connected at their ends with loops 100, attached to transverse pins 101, held within recesses 102. These loops 100 may slide outwardly through openings 100$^a$. The springs 98 take up the primary shocks, while the retractile springs 99 take up the secondary or rebound shocks.

There being two pairs of the scissors like construction it is obvious that two sets of links must be provided to pivotally connect the lower ends of the same with the leaf spring of the automobile. As clearly shown in Figure 17, the leaf spring 101′, has its end bent into an eye 102′, receiving the inner ends of tubular brass bushings 103. These tubular bushings receive inner tubular brass bushings 104, projecting outwardly beyond the first named bushings. A tubular bolt 105 is passed through the inner tubular bushing and is provided in one end with a washer 106, a head 107, and a grease cup 108. The tubular bolt is apertured, as shown. At its opposite end, this bolt carries a nut 109 and a washer 110.

The numeral 111 designates pairs of outer links, provided at their lower ends with head 112, pivotally mounted upon the bushings 103. These links 112 are provided at their upper ends with heads 113, provided upon their inner faces with annular grooves 114, to receive annular flanges 115, formed upon the opposite faces of the lower ends of the levers 89. A tubular apertured bolt 116 pivotally connects these parts and the same may be equipped with a suitable grease cup 117 for supplying the lubricant thereto. The function of the annular grooves and flanges is to provide a construction which will prevent the lubricant from escaping. The numeral 118 designates inner links, provided at their lower ends with heads 119, pivotally mounted upon the outer bushings 103. The links 118 are provided at their upper ends with heads 120, receiving therebetween heads 121 formed upon the lower ends of the levers 87. The heads 121 are provided upon their opposite faces with annular ribs or flanges 122 fitting within annular grooves 123, formed in the heads 120. These engaging parts are pivotally connected by tubular apertured bolts 124, carrying grease cups 125 whereby the parts are properly lubricated.

The perch 82 is provided with a transverse opening 126, receiving a transverse adjustable stop 127, adapted to be locked in a desired position by a set bolt 128. This stop has notches affording inclined faces 129 and 130, which may contact with the edges of the levers 87, and limit there swinging movement in that direction. This is important, to serve as a retarding or breaking action to prevent side sway of the automobile.

In view of the foregoing description, it is obvious that the primary shocks will be absorbed by the springs 98, by virtue of the action of the pivoted levers. The secondary rebound shocks will be absorbed by the springs 99.

It is to be understood that the forms of my invention herewith shown and described, are to be taken as preferred examples of the same, and that various changes in the shape, size, and arrangement of parts may be resorted to without departing from the spirit of my invention or the scope of the subjoined claims.

Having thus described my invention, I claim:

1. In a shock absorber, a perch, a pair of levers pivotally mounted upon the perch between their ends and having parts which cross, a compressible coil spring held between corresponding ends of the levers, hooks formed upon the opposite ends of the levers, links having their outer ends pivotally mounted within the hooks, grease cups receiving the outer ends of the links and arranged between the links and the sides of the hooks, a pivot element connecting the inner ends of the links, and a leaf spring supported by the pivot element.

2. In a shock absorber, a perch, an upper lever pivoted upon the perch and having a lower angularly arranged portion which extends toward the free ends of the lever, a lower lever pivotally mounted upon the perch and having an angularly arranged portion which extends from the free end of such lower lever, a compressible coil spring held between the free ends of the levers, links having their outer ends pivotally connected with the ends of the angularly arranged portions, and a pivot element connecting the inner ends of the links, and adapted for connection with the leaf spring of the automobile.

3. In a shock absorber, a perch, an upper lever pivoted upon the perch and embodying a forked portion, a lower lever pivoted upon the perch and embodying a forked portion, a compressible coil spring held between the free ends of the levers, pairs of links having their outer ends pivotally connected with the ends of the forked portions, and a pivot element connecting the inner ends of the pairs of links.

4. In a shock absorber, a perch, a pair of levers pivoted upon the perch, a resilient element held between corresponding ends of the levers, a rubber bumper carried by the lower lever and adapted to contact with the axle of the automobile, and load supporting means pivotally connected with the opposite ends of the levers.

5. In a shock absorber, a pair of levers, a perch, means pivotally mounting the levers upon the perch, a compressible coil spring held between the ends of the levers, rubber bumpers carried upon the inner sides of the levers, a rubber bumper carried upon the outer side of the lower lever, and load supporting means connected with the opposite end of the levers.

6. In a shock absorber, a perch, a pivot element carried thereby, an upper lever having a forked portion embodying a pair of spaced arms, means whereby one arm is laterally adjustable with respect to the lever, said arms having openings for receiving the pivot element, a lower lever having a forked portion including a pair of spaced arms which have openings to receive the pivot element, a spring held between the corresponding ends of the levers, pairs of links having their inner ends pivotally connected with said arms, and adjustable pivot means connecting the inner ends of the links, and serving as load supporting means.

In testimony whereof I affix my signature.

ROBERT L. GOODFELLOW.